Jan. 10, 1956   J. F. SCHNACKY   2,729,893
CONTINUOUS LEVEL-SENSING DEVICE
Filed April 20, 1953
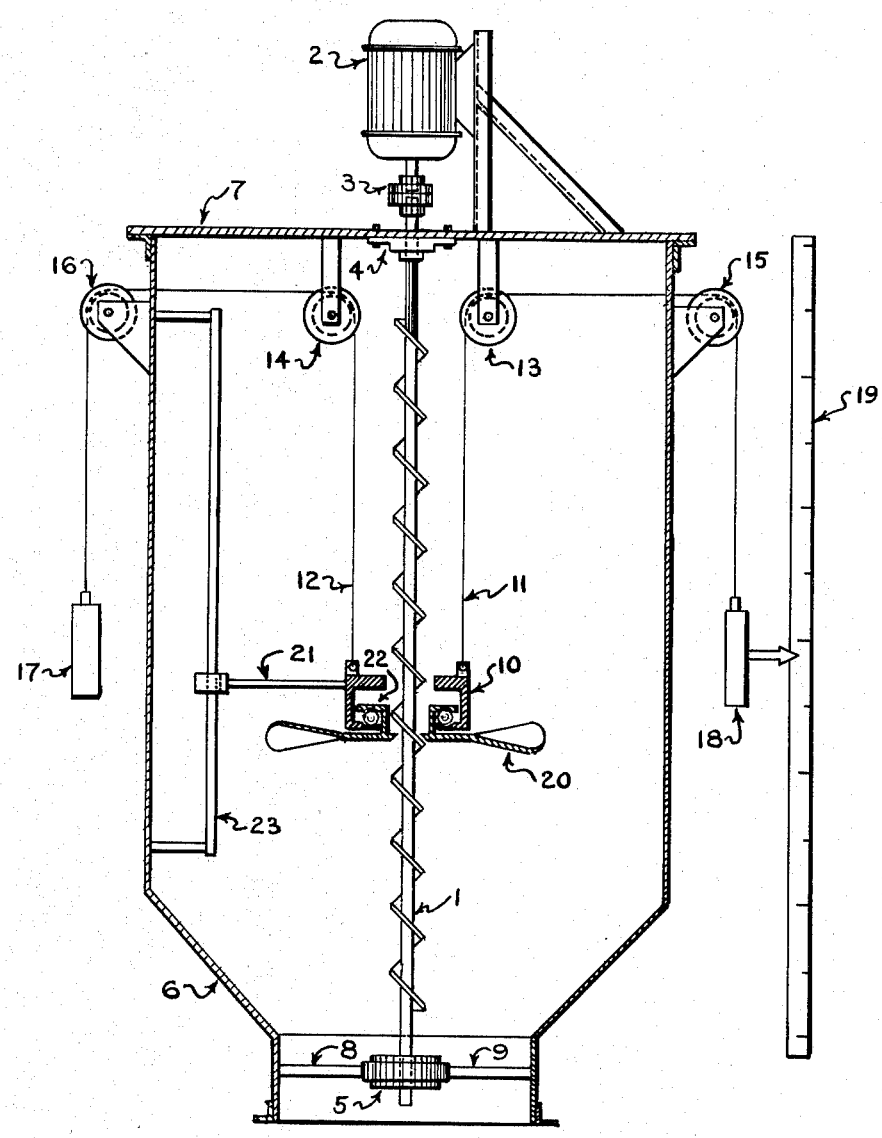
Inventor:
John Francis Schnacky

United States Patent Office 2,729,893
Patented Jan. 10, 1956

2,729,893
CONTINUOUS LEVEL-SENSING DEVICE

John Francis Schnacky, Buffalo, N. Y.

Application April 20, 1953, Serial No. 349,615

1 Claim. (Cl. 33—126)

My invention relates to improvements in level-sensing machines by which the level of a material is to be measured, and by which this level is to be indicated, recorded, or controlled. The objects of my improvements are: first, to continuously provide an actual material level indication; second, to afford facilities for attaching this continuous level indication to a secondary control instrument which operates by continuously receiving the instantaneous level indication; third, to provide a rotating assembly which is actuated by contact with solids or liquids and balanced by a force.

I attain these objects by mechanism illustrated in accompanying drawing, in which—

Screw shaft 1 continuously turns, driven by motor 2 and connected to the shaft of motor 2 by coupling 3. Bearing 4 and bearing 5 vertically align screw shaft 1 in vessel 6. Bearing 4 is flanged to cover plate 7, and bearing 5 is attached by bars 8 and 9 to vessel 6.

On screw shaft 1 is mounted rotor suspension block 10 suspended by two cables 11 and 12 extending over sheaves 13 and 14, through vessel 6, and over sheaves 15 and 16. To the external end of cable 12 is attached counterweight 17 which is half the required balancing weight. To the external end of cable 11 is attached indicator-counterweight 18 which assembly is half the required balancing weight. The indicator arrow on indicator-counterweight 18 travels vertically up and down in front of fixed scale 19 which is calibrated to read level of material in vessel 6. At low level, indicator-counterweight 18 is pulled high by cable 11, therefore low level is indicated at the upper portion of scale 19.

Rotor 20 continuously follows at the level of material in vessel 6. The combined weight of rotor 20, guide bar 21, rotor suspension block 10, ball bearings 22, and cables 11 and 12, is slightly greater than the sum of counterweight 17, indicator-counterweight 18, and the friction in sheaves 13, 14, 15, and 16. Therefore when the material level drops, rotor 20 spins down with the dropping level because it derives its remaining balancing force by contact with the surface of the material. Then when the material level rises, enveloping material restricts rotor 20 and screw shaft 1 is pitched so rotor 20 is pulled to the surface of the material where it can once more rotate freely with screw shaft 1 and be supported on the surface of the material.

The ball bearings 22 make it possible for rotor 20 to rotate with screw shaft 1. The guide bar 21 is slotted at its end near guide rod 23, and restricts rotor suspension block 10 to vertical motion only. Thereby cables 11 and 12 are always properly aligned with sheaves 13, 14, 15 and 16.

I claim:

The combination with a vessel for liquid or fluent solid material, of a device for sensing and indicating the level of the material comprising a shaft having a screw thread thereon, said shaft extending vertically through the material in said vessel and being supported rotatably thereby, means for rotating the shaft in a sense to advance the screw thread upwardly, a rotor on said shaft threadedly engaged thereby, said rotor having portions adapted when engaged by said material to frictionally retard its rotation with the shaft so as to cause it to progress upwardly with the advance of said screw thread, and said rotor being freely rotatable downwardly along said screw thread when out of engagement with said material.

References Cited in the file of this patent
UNITED STATES PATENTS 2,529,843   Kehrer _____ Nov. 14, 1950

FOREIGN PATENTS 456,324   Germany _____ Feb. 21, 1928
76,114    Sweden _____ Dec. 20, 1932